(12) United States Patent
Moglia et al.

(10) Patent No.: US 8,459,537 B2
(45) Date of Patent: Jun. 11, 2013

(54) EASY RECLOSING SYSTEM FOR A CONTAINER FOR DRY FOODSTUFFS AND RELATED CONTAINER

(75) Inventors: Roberto Moglia, Parma (IT); Michele Amigoni, Salsomaggiore Terme (IT); Mario Innocente, Padua (IT)

(73) Assignee: Barilla G. e R. Fratelli S.p.A. (IT)

( * ) Notice: Subject to any disclaimer, the term of this patent is extended or adjusted under 35 U.S.C. 154(b) by 309 days.

(21) Appl. No.: 12/874,818

(22) Filed: Sep. 2, 2010

(65) Prior Publication Data

US 2011/0068158 A1  Mar. 24, 2011

(30) Foreign Application Priority Data

Sep. 7, 2009 (EP) ..................................... 09425340

(51) Int. Cl.
*B65D 5/10* (2006.01)
(52) U.S. Cl.
USPC ............................ 229/158; 229/155; 229/222
(58) Field of Classification Search
USPC .......................... 229/132, 136, 155, 158, 222
See application file for complete search history.

(56) References Cited

U.S. PATENT DOCUMENTS

| | | | | |
|---|---|---|---|---|
| 2,287,520 A | * | 6/1942 | Freshwaters | 229/132 |
| 2,297,571 A | * | 9/1942 | Lowey | 229/155 |
| 2,342,873 A | * | 2/1944 | Lester | 229/155 |
| 2,532,035 A | | 11/1950 | Carter | |
| 2,532,085 A | * | 11/1950 | Carter | 229/158 |
| 3,107,840 A | * | 10/1963 | Vesak | 229/185 |
| 3,319,869 A | * | 5/1967 | Ostwald | 229/155 |
| 4,502,600 A | * | 3/1985 | Webinger | 229/222 |
| 4,723,658 A | * | 2/1988 | Steel | 229/222 |
| 4,821,951 A | | 4/1989 | Franzoni | |
| 2001/0004086 A1 | | 6/2001 | Wiart | |
| 2005/0051612 A1 | * | 3/2005 | Jouppi et al. | 229/158 |
| 2006/0163335 A1 | * | 7/2006 | Pokusa et al. | 229/136 |

FOREIGN PATENT DOCUMENTS

| | | |
|---|---|---|
| CH | 525804 A | 7/1972 |
| DE | 202006005986 U1 | 9/2006 |

* cited by examiner

*Primary Examiner* — Gary Elkins
(74) *Attorney, Agent, or Firm* — Akerman Senterfitt

(57) ABSTRACT

Easy reclosing system for a container (1) of dry foodstuffs comprising a first flap (2) and a second flap (3) designed to overlap at least partially to obtain the closure of the container (1), where the first flap (2) has a first hooking edge (2a) extending longitudinally and having a substantially rectilinear external profile, while the second flap (3) has a second hooking edge (3a) whereon a tongue (4) is formed along the external profile by means of two lateral notches (5) at the sides of the tongue, defining a respective lateral portion (6); the profile of the tongue (4), of the notches (5) and of the lateral portions (6) lying along the external perimeter profile of the hooking edge (3a) of the same second flap (3), said tongue (4) being configured in such a way as to overlay a corresponding portion of the first hooking edge (2a) of the first flap (2) with said lateral portions (6) arranged below said first edge (2a), when the two flaps (2,3) lie substantially on the same plane, so as to obtain a reusable closure of the container.

6 Claims, 6 Drawing Sheets

EASY RECLOSING SYSTEM FOR A CONTAINER FOR DRY FOODSTUFFS AND RELATED CONTAINER

The present invention relates to an easy reclosing system for a container of dry foodstuffs and related container.

More particularly the present invention relates to a container made in cardboard or plastic material for containing dry pasta and the like.

Containers are known in cardboard with a parallelepiped shape for containing dry pasta in standard quantities, usually of 500 or 1000 g.

The containers for dry pasta of the prior art provide for a system of opening from above wherein two opposite pairs of closure elements are present.

More particularly a first pair is formed by smaller elements, placed at the shorter sides, and a second pair is formed by larger elements, flaps, extending longitudinally and which, in a state of closure, overlap partially along the longitudinal edge to ensure closure of the container, with the smaller elements of the first pair positioned below.

In practice the smaller lateral elements prevent easy access to the container when the flaps are in the closed position.

Naturally, to ensure closure of the container, a layer of glue is spread on the longitudinal edge of the flap which is topped by the opposite flap.

A container of this type is not suitable for being reclosed for subsequent consumption after partial use of the contents, therefore it is possible that during accidental upsetting of the container most of the residual contents can spill out.

In order to overcome this disadvantage it was decided to form on the narrow side of the container a semicircular cutting line placed near the plane formed by the flaps in the closure position.

With this latter system the contents can be extracted by exerting a thrust force inside the cutting line in order to form a tongue therefrom which moves into the same container, thus opening a gap of the same size through which the contents can be poured.

Although this formed mobile tongue prevents, even if in actual fact only partially, the accidental spilling of the contents in the event of upsetting, it does not however facilitate the action of pouring, above all with large size pasta.

Other closure systems have been developed but they too are not free from disadvantages for various reasons, such as the difficult or costly manufacture for cardboard containers of dry foodstuffs, the difficult maneuverability inherent in the complexity of the closure action, the imperfect seal of the closure formed with the simpler systems, etc.

The need is therefore strongly felt for the availability of a new and easy reclosing system for a container of dry foodstuffs which is economical to make and which simplifies the operation of closing and opening of the container whereon it is applied, at the same time guaranteeing adequate seal in the closure position, without jeopardising the pouring capacity, all this as part of a simple and rational constructional solution.

The object of the present invention is that of providing an easy reclosing system and a container having features such as to fulfil the aforementioned needs and at the same time avoid the disadvantages described with reference to the prior art.

This object is achieved by means of an easy reclosing system for a container of dry foodstuffs and related container, in accordance with claims 1 and 5 respectively.

The dependent claims describe preferred and particularly advantageous embodiments of the reclosing system and of the container respectively, according to the invention.

Further features and advantages of the invention will be made clear from the reading of the following description given by way of a non-limiting example with the aid of the accompanying drawings, in which.

Figure 1:
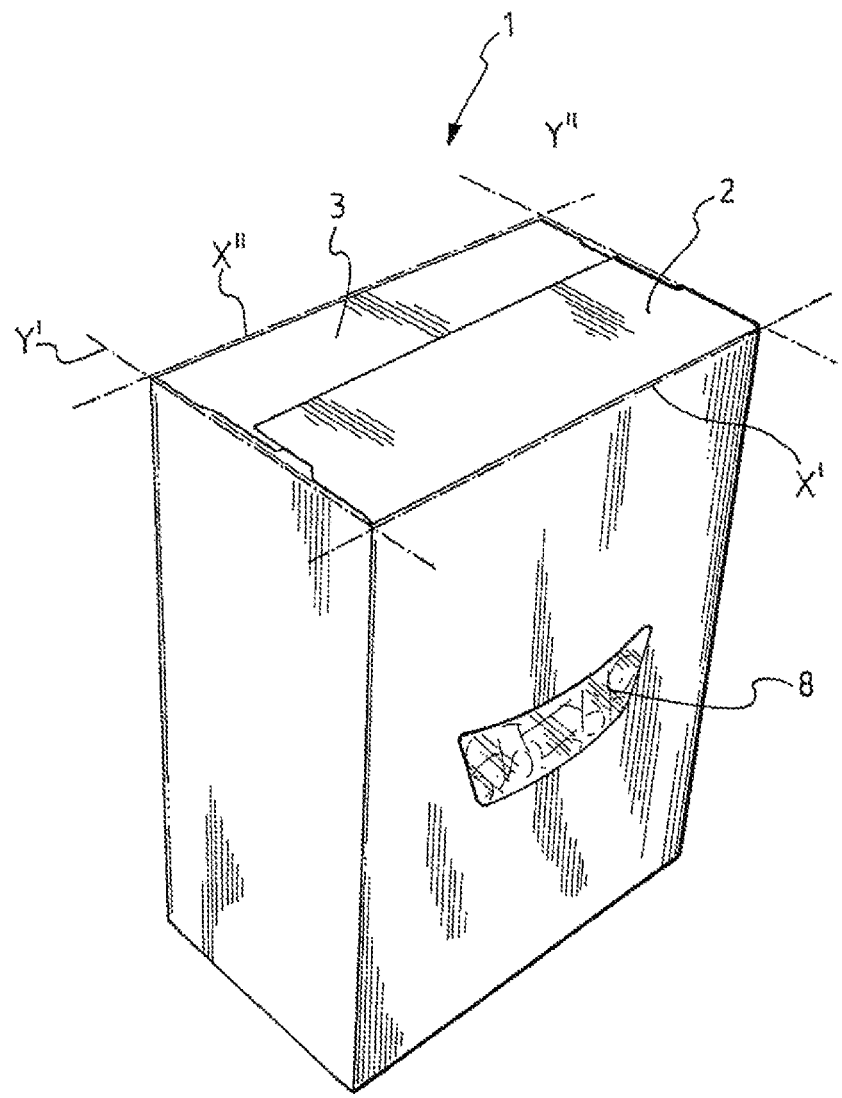
FIGS. 1-5 show different perspective views in different conditions of use of a same container provided with an easy reclosing system according to the present invention.

Referring to FIGS. 1-5, 1 generally denotes a container of dry foodstuffs, in the example this container is made in cardboard.

The container 1 is formed by a prismatic box-like structure, parallelepiped in the example, with a support base, not visible, and four lateral containment walls, opposite two by two.

In the example one pair of opposite walls has a width greater than the remaining pair.

In the upper part, opposite the base, a reclosing system is provided, formed by a first and a second flap, denoted respectively by 2 and 3 in the drawings, which derive from a respective folding line, denoted by x' and x'', of the pair of walls with greater width.

These first and second flaps 2, 3 have a height such as to be able to partially overlap them to create the closure of the container 1.

In accordance with the present invention the first flap 2 has a first hooking edge 2a extending longitudinally and having a substantially rectilinear external profile. Instead the second flap 3 has a second hooking edge 3a whereon a tongue 4 is formed along a longitudinal perimeter by means of two lateral notches 5, which border at the sides of the tongue 4 a respective lateral portion 6 side by side with the tongue 4.

In practice, each one of the two notches 5 is made simply by carrying out a cut without removal of material starting from the external longitudinal perimeter.

More particularly, at least one portion of the profile of the tongue 4 is made to lie along the external perimeter profile of the hooking edge 3a of the second flap 3.

In the example the profile of the tongue 4 defined by the two lateral notches 5 is semicircular, with a central portion of the tongue 4 forming the external profile of the flap 3, while the two remaining portions of the tongue 4 placed at the sides of the central one are directly side by side with the lateral portions 6 of the flap 3, wherefrom they are separated only by the lateral notches 5.

In practice the external perimeter profile of the second flap 3 is defined by the central portion of the profile of the tongue 4 and by the lateral portions 6.

The reusable closure condition of the container 1 via the reclosing system of the present invention places the first flap 2 below the tongue 4, which positions itself above a corresponding portion of the first edge 2a of the first flap 2, with the two lateral portions 6 of the second flap 3 which remain below the first flap 2.

In practice the first flap 2 is inserted between the two notches 5 placed laterally to the tongue 4.

In the illustrated example the external profile of the first flap 2 extends parallel to the folding line x'.

The tongue 4 is formed centrally with semicircular profile and the two lateral portions 6 of the second flap 3 are substantially identical. Moreover the height of the first flap 2, which is constant along its entire extension given that it has a rectilinear profile, is substantially equal to that of the second flap 3 measured with reference to the lateral portions 6.

In order to facilitate the operation of reusable closure the longitudinal edge of the second flap 3 has a central cut-out portion whereon the two notches 5 are formed to form the tongue 4 therefrom.

In this way the tongue 4 does not intersect the rectilinear continuation line of the external perimeter profile of the two lateral portions 6.

In practice, the second flap 3 has a height measured at the apex of the tongue 4 lower than the height measured at the lateral portions 6, the latter being equal to the height of the first flap 2.

For clarity of description it should be pointed out that the height of the flaps refers to the measurement taken starting from the corresponding folding line of the opposite walls of the container 1.

In order to guarantee more adequate closure the presence of a further two opposite fins 7 is provided, which are positioned, in closure conditions, below the two flaps 2,3, as known in the art.

These two fins 7 lead off from a respective folding line y',y" of the two opposite walls with smaller length of the container 1. In practice they are placed at the sides of the two flaps 2,3.

Figure 2:
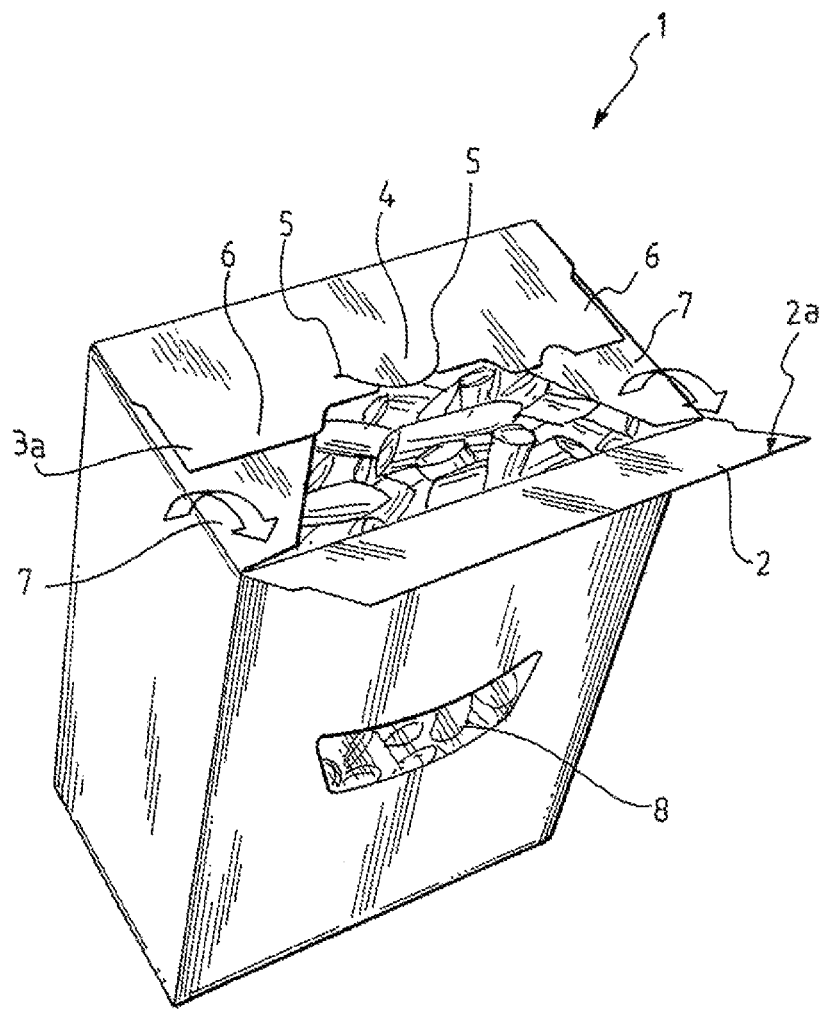
Figure 3:
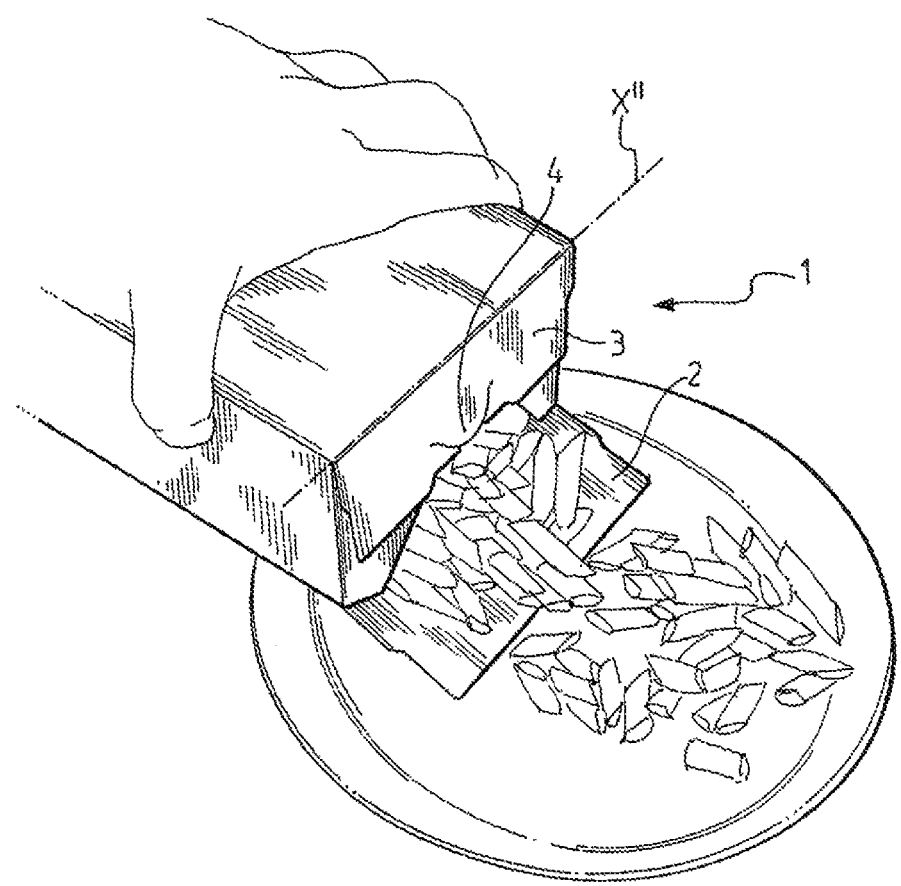
Figure 4:
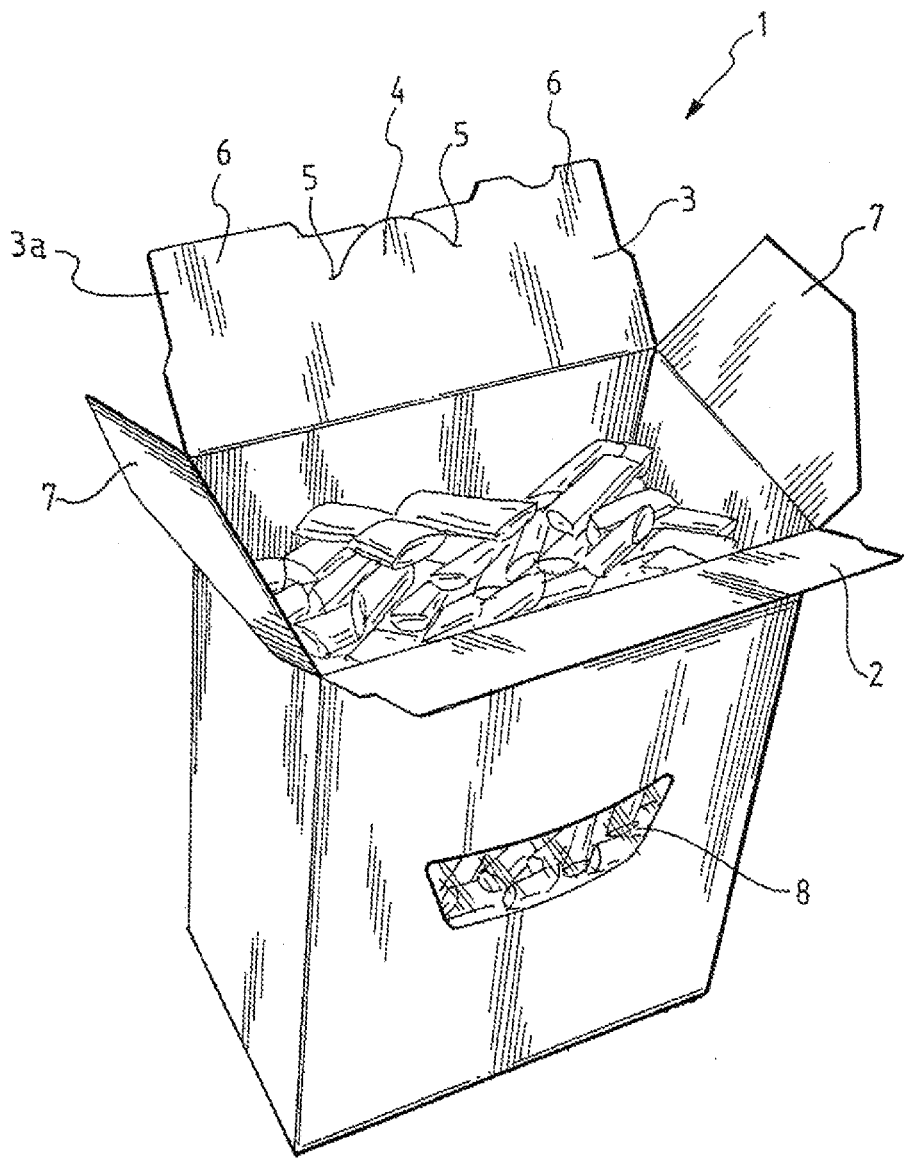
Figure 5:
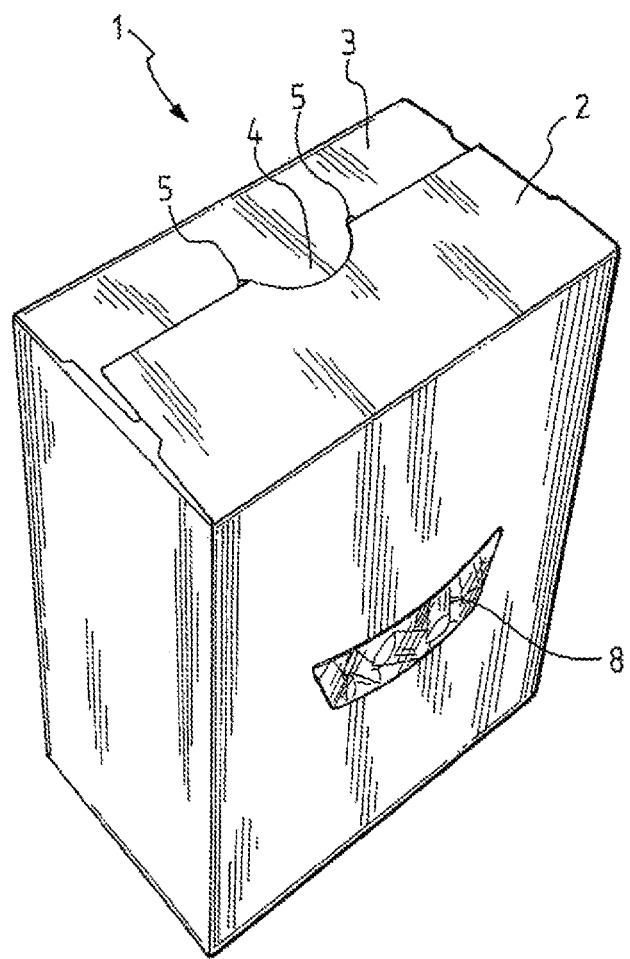

In accordance with the preferred embodiment of the present invention, the two opposite fins 7 have a cut of a respective angle such as to form, with only the second flap 3 overlapping them (and therefore with the first flap 2 raised), an opening with a trapezoidal shape for access to the container 1 (FIG. 2).

Should it be required that the contents inside the container 1 be visible from the outside when the container is closed, it is possible to provide for the formation of a transparent window 8 on at least one of the lateral walls of the container 1. Naturally, should the container have to be made from a transparent material, such as for example a plastic material, this window will no longer be necessary for the aforementioned purpose.

Figure 6:
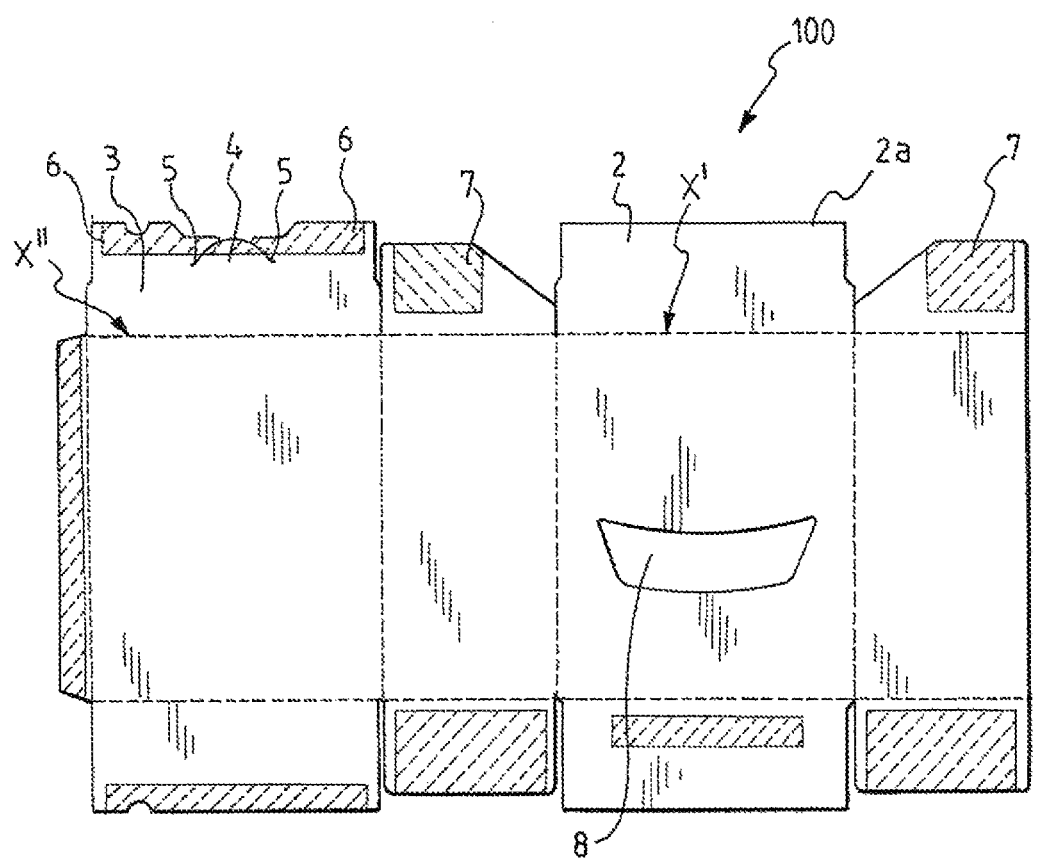
FIG. 6 shows a plan view of a folding sheet for making a container of dry foodstuffs, in accordance with the present invention.

Thanks to the configuration of the flaps 2,3 according to the invention, the making of the container 1 begins with a flat element in cardboard, denoted by 100 in FIG. 6, which has folding lines and cutting lines which are easy to form, thanks above all to the fact that the tongue 4 is made by simply removing a small portion of material through the cutting of material exclusively along the external profile of the second flap 3.

Moreover the flat element in cardboard 100 can be produced from traditional elements in cardboard, with consequent saving, by simply creating the tongue 4 according to the profile in accordance with the present invention.

Operatively the container 1 according to the present invention is initially presented closed with glue to protect the contents.

This closure is achieved by folding the two lateral fins 7 and fastening with glue the second flap 3 onto them.

Subsequently the first flap 2 is closed, fastening it with two lateral lines of glue (on the lateral portions 6) and a central dot of glue (on the tongue 4) to the second flap 3 already glued to the lateral fins 7.

The first opening is achieved by detaching the first flap 2 from the second flap 3.

At this point it is possible to pour the contents through the trapezoidal opening defined by the second flap 3 glued to the lateral fins 7.

Thanks to this special configuration pasta of greater size can also be poured in a rapid and controlled manner.

This is in addition to the possibility of bending the lateral wall of the container 1 to adjust the obtained outlet gap as required.

Naturally, should it be so required, it is possible to detach the second flap 3 from the lateral fins 7 to obtain an opening of a larger size.

At the end of pouring, the container 1 is closed again to conserve the remaining contents and make them available for subsequent use.

This reusable closure is easily obtained by placing the first flap 2 above the second flap 3 and exerting a pressure centrally, at the location of the hidden tongue 4, on the first flap 2 towards the interior of the container 1.

The pressure exerted must be sufficient to take the edge 2a of the first flap 2 below the tongue 4, which on release of the pressure force will be positioned stably above the first flap 2, forming the reusable closure of the container.

Naturally it is necessary that, when pressure is exerted on the first flap 2 to perform the closure with overlapping of the tongue 4, the longitudinal, hooking edge 2a of the first flap 2 is right above the tongue 4 defined by the two lateral notches 5.

Substantially, the hooking edge 2a of the first flap 2 may not exceed the two notches 5.

The reopening of the container reusably closed takes place by simply raising the second flap 3 by means of the tongue 4 which is freely accessible from the outside.

In the description above explicit reference has been made to a parallelepiped container in cardboard; nevertheless, any other shape and/or material may be used to obtain the invention. For example it is possible to use exclusively plastic material, such as polypropylene for foodstuffs, usually of the thickness of 500 microns.

More particularly it is possible to obtain the reclosing system according to the present invention also in a different position compared to that indicated in the example illustrated.

As can be seen from what is described, the easy reclosing system and related container for dry foodstuffs according to the present invention allow for meeting the needs and overcoming the disadvantages mentioned in the introductory part of the present description with reference to the prior art.

In fact both opening and closure of the container can be achieved with the simple pressure of a finger of the user's hand.

Moreover the reusable closure which can be obtained with the system according to the present invention ensures perfect seal in case of accidental upsetting.

Finally, another possibility could be that of making containers for dry foodstuffs, such as pasta, with the reclosing system according to the present invention on the basis of flat elements in cardboard of the traditional type, simply modifying the flap whereon the tongue is to be formed in accordance with the present invention.

Obviously a person skilled in the art may apply numerous modifications and variations to the easy reclosing system and related container described above in order to fulfil contingent and specific needs, all of which, however, are contained within the scope of protection of the invention, as defined by the following claims.

The invention claimed is:

1. An easy reclosing system for a container of dry foodstuffs, said system comprising:
    a first flap and a second flap designed to overlap partially to achieve the closure of the container; and
    two lateral fins;
    wherein the first flap has a first hooking edge extending longitudinally and having a substantially rectilinear external profile, while the second flap has a second hooking edge whereon a tongue is formed along the external profile by means of two lateral notches at the sides of the tongue, defining respective lateral portions;

wherein the profile of the tongue and of the lateral portions lie along the external perimeter profile of the second hooking edge, said tongue having a semicircular profile and being configured and placed so as to be able to overlay a corresponding portion of the first hooking edge of the first flap with said lateral portions arranged below said first edge, when the two flaps lie in a closing manner substantially on the same plane, and wherein the two lateral portions have a cut angle at the edges closest to the tongue and the lateral fins have a cut angle such that, when the second flap overlays both lateral fins, each cut angle of the fins is continued in each cut angle of the lateral portions so that a continuous edge profile lying on a straight line is formed and an opening access having a substantially trapezoidal configuration is defined.

2. The reclosing system according to claim 1, wherein the external longitudinal profiles of said lateral portions lie on a common line of rectilinear continuation, said tongue not being intercepted by said line.

3. The reclosing system according to claim 2, wherein the height of said first flap is substantially identical to the height of the second flap when it is measured at the lateral portions.

4. A container for dry foodstuffs with a reclosing system comprising:

prismatic box-like structure with a support base and lateral containment walls;

a first flap and a second flap deriving from a respective folding line of two opposite lateral walls and designed to overlap partially to achieve the closure of the container; and two lateral fins deriving from a respective folding line of two different opposite lateral walls, all the folding lines lying on a common plane, wherein the first flap has a first hooking edge extending longitudinally and having a substantially rectilinear external profile, while the second flap has a second hooking edge whereon a tongue is formed along the external profile by means of two lateral notches at the sides of the tongue, defining respective lateral portions, wherein the profile of the tongue and of the lateral portions lie along the external perimeter profile of the second hooking edge, said tongue having a semicircular configuration and being configured and placed so as to be able to overlay a corresponding portion of the first hooking edge of the first flap with said lateral portions arranged below said first edge, when the two flaps lie in a closing manner substantially on the same plane, and wherein the two lateral portions have a cut angle at the edges closest to the tongue and the lateral fins have a cut angle such that, when the second flap overlays both lateral fins, each cut angle of the fins is continued in each cut angle of the lateral portions so that a continuous edge profile lying on a straight line is formed and an opening access to the container having a substantially trapezoidal configuration is defined.

5. The container according to claim 4, wherein the size and the arrangement of the flaps are such that the reusable closure is obtained by placing the second flap above the fins and the first flap above the second flap, with the lateral elements of the second flap arranged below the edge of the first flap and the tongue above the edge of the first flap.

6. The container according to claim 5, made of cardboard, a transparent window being provided for making the contents visible from the outside when the container is closed.

* * * * *